June 16, 1931.  H. J. MURRAY  1,810,494
DOUBLE CONE CLUTCH SYNCHRONIZER
Filed Dec. 30, 1926
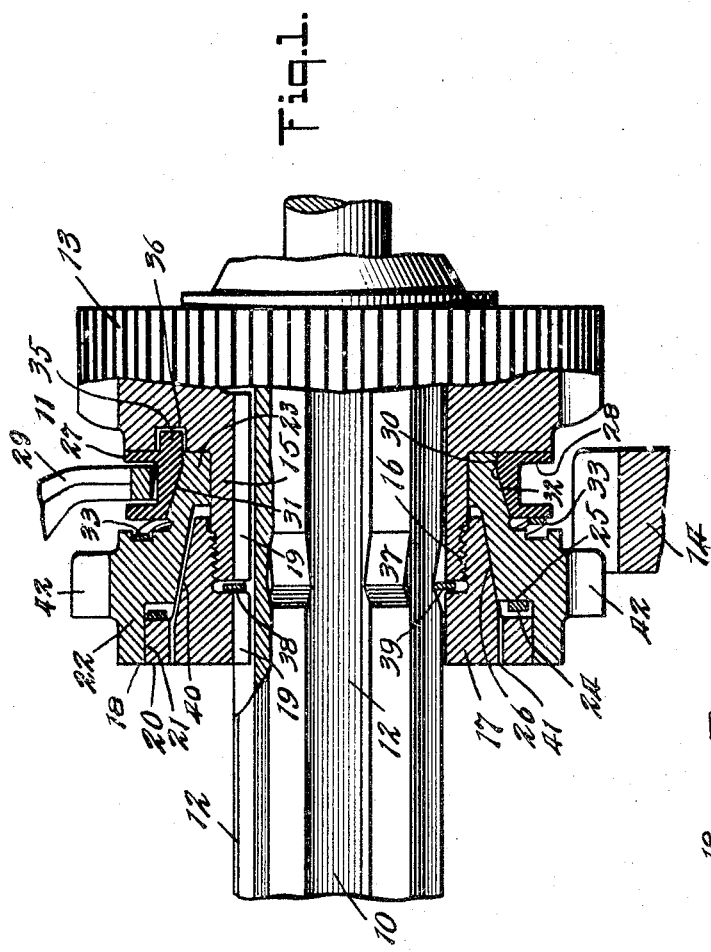
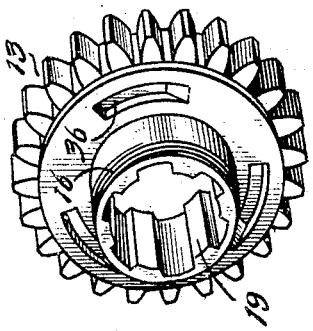
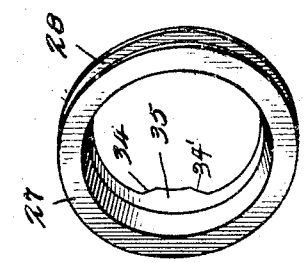
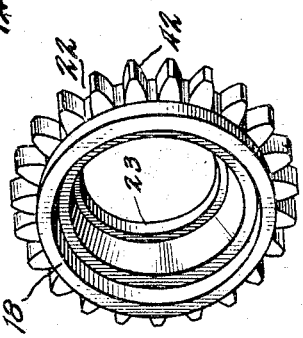
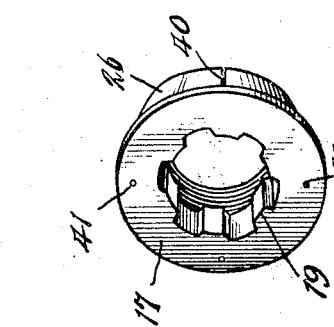
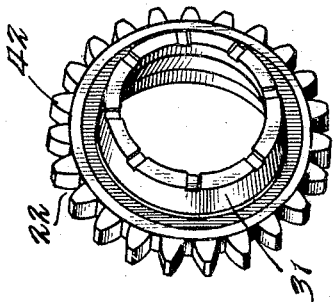
INVENTOR.
HOWARD J. MURRAY
BY
Warren S. Orton
ATTORNEY Patented June 16, 1931

1,810,494

UNITED STATES PATENT OFFICE

HOWARD J. MURRAY, OF BROOKLYN, NEW YORK, ASSIGNOR TO SURE-SHIFT TRANSMISSION CORPORATION, OF EAST PITTSBURGH, PENNSYLVANIA, A CORPORATION OF DELAWARE

DOUBLE CONE CLUTCH SYNCHRONIZER

Application filed December 30, 1926. Serial No. 158,125.

The invention relates to a synchronizing device for causing a pair of gears or other power transmitting members to approach the same speed just prior to being moved into meshing or into interdriving relation and the invention herein disclosed is an improvement in synchronizers of the cone clutch type disclosed in my co-pending application Serial No. 121,887 filed July 12, 1926.

The device selected for discussion and the said application which was in turn a development of certain forms of preceding synchronizers where the members to be synchronized were connected through the agency of different forms of friction clutches, in turn actuated by power derived from the rotary force of one of the members to be shifted, distinguishes therefrom among other respects in that the friction clutch was of a cone type.

The primary object of the present disclosure, as was the case of the form of the invention disclosed in the above identified application, is to provide a simplified form of gear synchronizer constructed to provide a powerfully acting clutching effect and which can be inaugurated without necessity of using a corresponding powerful muscular effort on the part of the operator.

Among the other objects of the invention and particularly applicable to the form herein selected for illustration are to provide in a synchronizer of the cone-clutch type an increase in mechanical advantage over the structure disclosed in the prior application above identified, to minimize the tendency of the parts to lock when actuated, to increase the efficiency of the clutching contact while maintaining small size and compactness of the parts, to provide for synchronizing at widely varying speeds and to provide for an automatic restoration of the parts to their normal, inoperative positions after they have functioned to effect the desired synchronizing action.

Various other objects and advantages of the invention will be in part obvious from an inspection of the accompanying drawings and in part will be more fully set forth in the following particular description of one form of device embodying the invention, and the invention also consists in certain new and novel features of construction and combination of parts hereinafter set forth and claimed.

In the drawings:

Fig. 1 is a fragmentary view of two of the power gears of the type found in transmission casings of conventional form equipped with a preferred embodiment of the inventive features disclosed in this and in the above identified co-pending application;

Figs. 2 to 5 inclusive are perspective views constituting an exploded showing of the several parts which go to make up the assembled unit shown mounted on the shaft in Fig. 1; Fig. 2 being a view of the end ring; Fig. 3 a view of the rear side of the synchronizing gear; Fig. 4 a view of the camming ring; and Fig. 5 a view of the power gear; and Fig. 6 is a perspective view showing the reverse side of the synchronizing gear from the view shown in Fig. 3.

In the drawings there is shown a power shaft 10 which, for the purpose of this disclosure, may be considered as a propeller shaft operatively connected to drive the traction wheels of an automobile, and particularly designed to drive a high speed automobile, or a heavy truck, where there is a demand to transmit heavy, high torque forces through the transmission casing and at the same time to change the speed combinations at all speeds.

A gear unit 11 is keyed to the shaft by means of splines 12 so as to rotate therewith and is shiftable axially thereon as is usual in such constructions to effect the several gear combinations. The shiftable unit 11 includes a power gear 13 (see Fig. 5) designed to mesh with a coacting power gear 14 keyed to another shaft (not shown) and which may be the jack shaft of a multiple four speed transmission gear shaft. In this disclosure it is assumed that it is desired to synchronize the gears 13 and 14.

The shiftable gear 13 is reduced at one end to form a hub extension 15 the end of which is externally threaded as shown at 16. An end ring 17 engages the threaded end of the hub extension, is adjustable axially thereon and has its outer periphery machined to provide a cylindrical bearing surface 18 for the rear end of the synchronizer hereinafter described. The inner periphery of the end ring rearwardly of the threaded forward portion is provided with lugs or spline fingers 19, by means of which the end ring is splined to the shaft 10 and constitutes in effect a part of the power gear 13.

The rear end of the end ring is provided with an outstanding flange 20 the outer periphery 21 of which is machined to form a rear bearing for a synchronizer 22 the inner end 23 of which is mounted for rotary movement directly on the hub extension 15 with a slight freedom of axial movement between the gear 13 and the adjacent end of the end ring. The outstanding flange 20 and the power gear 13 provide a peripheral groove for receiving the major portion of the synchronizer and the parts forming the second clutch hereinafter described.

A relatively powerful coiled spring 24 is positioned between the outstanding flange 20 and an internal shoulder 25 formed on the rear face of the synchronizer. The central portion of the inner periphery of the synchronizer 22 is formed frusto-conical so as to form a cone surface and coacts with a similarly designed surface formed at the inner portion of the outer periphery of the end ring to form a conical type of friction clutch 26 hereinafter referred to as the inner cone clutch.

Between the synchronizer 22 and the power gear 13 there is provided a second peripheral groove in which is rotatably mounted an actuator or camming ring 27 in turn provided with a peripheral groove 28 containing a shift fork 29 by means of which the camming ring is shifted axially of the shaft to and from a position to effect the necessary clutching action. The inner end of the outer periphery of the synchronizer, on which the camming ring rides, has an annular surface 30 and a conical surface 31. These surfaces coact with similar surfaces defining the inner periphery of the camming ring 27 to form a bearing for the camming ring in all positions thereof. The conical surfaces of the ring 27 and synchronizer 22 coact to form a second clutch of the cone type and hereinafter referred to as the outer cone clutch 32.

A coiled spring 33 less strong than the spring 24 is positioned between the synchronizer and the camming ring and tends normally to maintain the outer clutch in inoperative, unclutched position and with the camming device hereinafter described in an inoperative, inactive position.

The clutches may be moved sequentially into clutching engagement either by the manual actuation of the fork 29, or the power necessary to provide a powerful actuation of the clutches may be obtained from the rotative effect of the gear 13 acting on the camming ring 27 through the agency of inclined wedges 34 forming opposite sides of lugs 35 projecting from the adjacent side face of the camming ring, all as is more particularly described in copending applications Serial No. 614,502 filed January 23, 1923, and Serial No. 633,610 filed April 21, 1923. The spring 33 insures the reseating of the lugs 35 into the recesses 36 independent of the action of the shifting fork 29.

In order to impose some resistance to the freedom of axial movement of the unit 11 on the shaft and thus provide the necessary resistance to permit the movement of the clutches into operative position, the splines 12 of the shaft are provided with a circumferentially arranged series of beveled sided notches 37. Positioned in a pocket 38 formed by the recess between the end ring 17 and the end of the hub extension 15 on which it is threaded is a deterrent spring 39. The advantage of this arrangement over the deterrent springs disclosed in the preceding application is that there is no necessity of providing a separate housing for the springs in the shiftable unit. The clearance between the end ring and the power gear provides a convenient place to accommodate a single spring.

Where the device constitutes part of the gear drive in an automotive transmission casing, it is usually contained in oil or grease which seeps onto the faces of the friction clutches and in practice it takes time and energy in order to break the surface tension of the oil film before the clutching faces can be moved into their clutched position and this, of course, has a tendency to prolong the time interval necessary to effect the synchronizing. For the purpose of assiting to break the oil or other liquid film which may be present on the clutching faces of the cone clutches, one of the coacting faces is provided with a plurality of axially extending oil grooves 40. The end ring 17 is provided with a plurality of axially extending oil conduits 41 which tend to pump oil into the space between the clutching elements forming the inner clutch.

The outer periphery of the synchronizer is provided with teeth 42 designed to mesh with the teeth on gear 14 and which synchronizer when considered in connection with its teeth will be hereinafter referred to as a synchronizer gear. The number of teeth on the synchronizing gear differs slightly from the number of teeth on the power gear 13 and in the instant case it will be assumed that the number of teeth on the synchronizing gear is one less than the number of teeth on the gear 13. It is obviously within the scope of this disclosure to reverse this condition and have the greater number of teeth on the synchronizing gear. Differently expressed, the gears 13, 14 and 42 constitute a huntingtooth gear set with the gears 13 and 42 having the same pitch diameter and both designed to mesh with the common third gear 14. This construction permits the meshing of the counter and sliding gears even if the synchronizing gear be fully synchronized or turning at the the same angular velocity as the sliding gear and it also permits meshing of the gears at relatively low speed. It is possible to mesh the gears even when the positions of the teeth are in alignment as the teeth are in relatively slow angular movement even when the gears are turning at the same speed. In the condition illustrated where the number of teeth on the synchronizing gear is less than the number of teeth in the sliding gear 13 it follows that during the instant when gear 14 is in mesh with both gears 42 and 13, the gear 42 is moving slightly faster than gear 13 and this causes an automatic reversal of the previous turning relation, resulting in a seating of the lugs 35 in the recesses 36 and a release of the outer clutch. This will take place for instance when shifting from direct to second speed and from second to low where the construction illustrated is used on an automotive power transmission set.

In the specific form herein selected for illustration, there are twenty-three teeth on the synchronizer gear on a twenty-four tooth pitch diameter and there are twenty-four teeth on the power gear 13 thus providing one less tooth to the synchronizer gear. This arrangement has been selected as the shift down from high to second speeds is of greatest importance in automotive power transmission drives.

It is desired that the inner clutch 26 be the most powerful of the two and the cone surfaces forming the same are therefore made to have a small angle with reference to the axis of the shaft 10, in the instant case the angle is about 6 degrees. This small angle at the inner clutch permits the use of a higher cone angle surface at the outer clutch 32 and consequently as most of the synchronizing force or torque is directly applied to the spline fingers 19 there is effected a minimizing of the tendency of a locking of the cam faces at 34—35 and incidentally wear thereon is reduced.

In operation and assuming that in the showing in Fig. 1 the parts are in their normal, inoperative, unclutched condition and that the synchronizer gear is running idly in mesh with the jack shaft gear 14, pressure applied to the fork in a direction from right to left of the showing in the figure will inaugurate the desired synchronizing of the power gears. The relative movement between the shiftable power gear and the camming ring will cause the beveled face 34 to bear on the male actuating cam 35 and thus assist the fork in moving the camming ring into engagement with the synchronizer and effect a clutching action therewith through the outer cone clutch. It is, of course, obvious that the outer cone clutch may be brought into clutching condition solely as a result of the shifting action of the fork under the manual efforts of the operator before the camming device has had an opportunity to function. As the ring resisting spring 33 is relatively weak it will tend to give under the pressure from a weak muscular effort but as the synchronizer resisting spring is powerful it will tend to resist any manually applied force on the control ring. As the synchronizing gear is rotating at a speed different from that of the sliding gear, the cams 34, 35 will come into action or continue to ride out of their seats thus compressing the inner powerful springs until the inner powerfully acting clutch comes into clutching engagement to connect the synchronizing gear with the sliding power gear 13. As the synchronizing gear is in mesh with or was just previously in mesh with the power gear 14 it results that the gears 13 and 14 are synchronized or at least so closely synchronized in their rotary speed that a quiet, easy intermeshing of the power gears is attained.

As soon as the actuating pressure has been released from the fork, the several springs tend promptly to disconnect the parts which form the clutches and the device is restored to its normal inoperative position.

It is apparent from the disclosure herein that the forces applied to the shift fork and amplified by the action of the shifting cam is first applied to the outer cone clutch and then in sequence to the inner cone clutch so that the same force is used twice, the two cone clutches work with the same pressure and their braking forces are added to effect the relative speed in the synchronizing gear in the sliding gear. Another advantage of the device herein disclosed over the structure described in the above identified copending application No. 121,887 is that most of the pressure against the cam faces in the prior construction has been removed to the massive spline fingers on the end member thus reducing the possibility of the cam faces being locked. As the efficiency of the device is increased by making the inner or direct acting cone clutch more powerful than the outer cone clutch there is attained a still further reduction of pressure on the cam faces and further the possibility of the cam faces locking or jamming has been minimized.

In the form of camming clutch 34—35 illustrated the mating angle on opposite sides of the lug 35 are in each case approximately thirty degrees which has been selected experimentally as a satisfactory working construction. It is, however, obviously within the scope of the disclosure to design the one or both of these cams to have any other angularity even up to ninety degrees. In this latter case the camming action in the direction of such high angle becomes lost and dependence is thus placed upon the manual action of the fork 29 to effect the synchronizing.

By making the cam angle greater on one side than on the other, a greater degree of power synchronizer is attained on the side having the lower angle than on the side having the higher angle. For the purpose of supporting a claim reciting a difference in cam angles it can be assumed in the illustrated showing that the angle of the face 34' is slightly different from the other face 34 so that the greater power is utilized in shifting down from first to second speed.

Having thus described my invention, I claim:

1. In a device of the class described, the combination of a spline shaft, a gear unit slidable thereon, resilient means tending to restrain its freedom of axial movement on the shaft, said unit provided with a peripheral groove, a synchronizer mounted in said groove and having a slight freedom of axial movement relative to the sides of the groove, the inner periphery of the synchronizer and the bottom of the groove coacting to form a conical type of friction clutch, a control ring mounted on the synchronizer and having a slight freedom of axial movement thereon, the outer surface of the synchronizer and the inner surface of the control ring coacting to form a conical type of friction clutch and means engaging the ring for shifting the same axially in one direction to cause said friction clutches to be moved into operative condition.

2. In a device of the class described, the combination of two power members adapted to be moved into intermeshing position, one of said members provided with a relatively fixed conical clutch face, synchronizing means for causing the members to approach a common speed, said synchronizing means including a conical face adapted to engage the similar face on said power member to provide therewith a friction clutch of the cone type, actuating means for moving said clutch into operative position, said actuating means including a controlled member provided with a conical face, and said synchronizing means provided with a second conical face coacting with the similar face on the controlled member to provide therewith a second friction clutch of the cone type.

3. In a device of the class described, the combination of a spline shaft, a gear unit slidable thereon, said unit including a power gear having a hub extension, an end ring secured to the extension and splined to the shaft, said end ring provided with a conical surface constituting an element of an inner cone clutch, a synchronizer gear provided with a conical surface constituting the coacting element of said inner cone clutch and also provided with a second conical surface constituting an element of an outer cone clutch, a cam ring positioned between the power gear and the synchronizing gear and provided with a conical surface constituting the coacting element of said outer cone clutch and a control fork engaging said cam ring and movable in one direction to effect a clutching condition of both of said cone clutches.

4. In a device of the class described, the combination of a spline shaft, a gear unit slidable thereon, resilient means tending to restrain its freedom of axial movement on the shaft, said unit provided with a peripheral grove, a synchronizer mounted in said groove and having a slight freedom of axial movement relative to the sides of the groove, the inner periphery of the synchronizer and the bottom of the groove coacting to form a conical type of friction clutch, a control ring mounted on the synchronizer and having a slight freedom of axial movement thereon, the outer surface of the synchronizer and the inner surface of the control ring coacting to form a conical type of friction clutch, means engaging the ring for shifting the same axially in one direction to cause said friction clutches to be moved into operative condition, and resilient means tending to cause said clutches to become inoperative when free of the tension of said control ring.

5. In a gear synchronizer, the combination of two rotors to be synchronized, said rotors each provided with the element of a cone clutch and coacting to form a friction clutch of the cone type, an actuator, said actuator and one of said elements each provided with a cone clutch element and coacting to form a second friction clutch of the cone type, and means acting on the actuator for causing said cone clutches to function in sequence.

6. In a gear synchronizer, the combination of two rotors to be synchronized, said rotors each provided with a friction face, said faces coacting to form a friction clutch of the cone type, an actuator, said actuator and one of said rotors each provided with a friction face, said last named faces coacting to form a second friction clutch of the cone type, means acting on the actuator for causing said cone clutches to function in sequence, said actuator and one of the rotors provided with a cam for shifting the actuator into clutching engagement with the other rotor.

7. In a device of the class described, the combination of a unit adapted to be splined to a shaft and including a power gear, a synchronizing gear mounted for rotary movement thereon, means providing a friction clutch of the cone type between said gears, a control ring mounted for rotary movement on the synchronizer gear, means providing a friction clutch of the cone type between the synchronizer gear and the control ring, said cone clutches inclined in the same direction towards a common axis, the angle between said axis and the clutching surfaces of the last named cone clutch being greater than the corresponding angle between said axis and the clutching surfaces of the first named cone clutch.

8. In a gear synchronizer, the combination of two members to be synchronized, synchronizing means including a plurality of cone clutches providing a multiple faced friction drive between said members, and means actuated by the power inherent in one of the members for causing said cone clutches to be moved into operative position thereby to drive one member from the other through said multi-faced friction cone clutches.

9. In a gear synchronizer, the combination of two members to be synchronized, synchronizing means for causing said members to approach a common speed and including a plurality of cone clutches coacting to form a multi-faced friction clutch, means actuated by the power inherent in one of the members for causing said friction clutch to be moved into operative position, and a manual actuated control for inaugurating the action of said synchronizing means.

10. In a gear synchronizer, the combination of two members to be synchronized, synchronizing means including a plurality of cone clutches for causing said members to approach a common speed, means actuated by the power inherent in one of the members for causing said cone clutches to be moved into operative position, and a manual actuated control for inaugurating the action of said synchronizing means, said two clutches having their interengaging surfaces at different angles to their common axis.

11. In a device of the class described, the combination of a power gear, synchronizing means carried by the power gear and including a synchronizing gear, means providing a friction clutch of the cone type between said synchronizing gear and the power gear, a relatively powerful spring tending to separate the coacting elements of said clutch, a control ring, means providing a second friction clutch of the cone type between said synchronizer gear and the control ring, a relatively weak spring tending to separate the elements of said second clutch, and means acting on the control ring to move the same against the resistance of said weak spring and acting through the synchronizing means to move the same against the resistance of the strong spring and into clutching engagement with the gear on which it is mounted.

12. In a device of the class described, the combination of a shaft provided with a recess, a unit slidable on the shaft and including a power gear, an end ring adjustable axially on the power gear and providing a spring pocket therebetween and a spring contained in said pocket and distendable into the recess in the shaft to restrain the freedom of axial movement of the unit on the shaft.

13. A unit provided with means for mounting it on a spline shaft to rotate therewith, and including a power gear, a synchronizer mounted on the power gear, means providing a cone clutch between the synchronizer and power gear, mechanism for shifting the synchronizer axially to cause said clutch to be moved into operative position, and means providing a cone clutch between said mechanism and said synchronizer.

14. In a device of the class described, the combination of a pair of power gears, mechanism for causing them to approach the same speed, said mechanism including elements coacting to provide a plurality of cone clutches disposed side by side, the end element of one clutch adapted to be connected in driving relation to one of the power gears, the end element of another clutch adapted to be connected in driving relation to the other power gear and said elements coacting to provide a multiple face friction drive between the power gears and a single actuator for causing said friction drive to become operative.

15. In a device of the class described, the combination of a pair of power gears, mechanism for causing them to approach the same speed, and including a plurality of cone clutches coacting to provide a multiple face friction drive between the power gears and a single actuator for moving the clutches into interclutching relation thus causing said drive to become operative, and each of said clutches provided with means tending to separate their respective clutching faces when free of said actuator.

16. In a device of the class described, the combination of a pair of power gears, mechanism for causing them to approach the same speed, and including a plurality of cone clutches disposed side by side and coacting to provide a multiple face friction drive between the power gears and a single actuator for causing said drive to become operative, and each of said clutches provided with springs tending to separate their respective clutching faces when free of said actuator, and said springs being of different strengths.

17. In a device of the class described, the combination of a power gear, a synchronizer mounted thereon and adapted to be shifted axially into clutching engagement with the power gear, a control ring, and means providing a friction clutch of the cone type between the control ring and the synchronizer whereby a shifting movement of the control ring in one direction will cause it to bear on the synchronizer and therethrough to cause the synchronizer to move into clutching engagement with the power gear.

18. In a device of the class described, the combination of a power element, a synchronizing device including an actuating ring, means between the ring and element for shifting the ring axially, said means including a two-faced camming device operable by relative rotation between said ring and element in both directions, one of the faces being more sharply inclined than the other to a plane perpendicular to the axis of rotation of the ring and element whereby said axial shifting of the ring is more powerful for any given relative rotary movement when the relative rotary movement is in one direction than in the other.

19. In a device of the class described, the combination of two rotors mounted for rotary movement about a common axis, means therebetween for driving one from the other, said means including a finger extending axially from one projecting into a recess in the other, having a slight freedom of relative axial movement, one side of the finger coacting with the adjacent face of the recess to form a cam for causing relative axial movement between the rotors and the other side of the finger coacting with its adjacent face of the recess and forming therewith a cam angle different from the angle formed by the first named side and its recessed face.

Signed at New York in the county of New York and State of New York this 29th day of December A. D. 1926.

HOWARD J. MURRAY.